(12) United States Patent
Lambert et al.

(10) Patent No.: US 10,175,482 B2
(45) Date of Patent: Jan. 8, 2019

(54) DISPLAY DEVICE FOR A MOTOR VEHICLE

(71) Applicant: Johnson Controls Automotive Electronics SAS, Cergy Pontoise (FR)

(72) Inventors: Yves Lambert, Osny (FR); Giany Pitte, Osny (FR); Stephane Bergot, Fresneaux Montchevreuil (FR); Olivier Luneau, Auvers-sur-Oise (FR)

(73) Assignee: JOHNSON CONTROLS AUTOMOTIVE ELECTRONIC SAS, Cergy Pontoise (FR)

( * ) Notice: Subject to any disclaimer, the term of this patent is extended or adjusted under 35 U.S.C. 154(b) by 136 days.

(21) Appl. No.: 15/307,376

(22) PCT Filed: Apr. 29, 2015

(86) PCT No.: PCT/EP2015/059427
§ 371 (c)(1),
(2) Date: Jan. 16, 2017

(87) PCT Pub. No.: WO2015/166012
PCT Pub. Date: Nov. 5, 2015

(65) Prior Publication Data
US 2017/0168299 A1 Jun. 15, 2017

(30) Foreign Application Priority Data
Apr. 30, 2014 (FR) ..................................... 14 01012

(51) Int. Cl.
*G02B 27/01* (2006.01)
*B60K 35/00* (2006.01)
(Continued)

(52) U.S. Cl.
CPC .......... *G02B 27/0149* (2013.01); *B60K 35/00* (2013.01); *B60K 2350/1072* (2013.01);
(Continued)

(58) Field of Classification Search
CPC ............ G02B 27/0179; G02B 27/0181; G02B 27/0149; G02B 27/015; G02B 27/01;
(Continued)

(56) References Cited

U.S. PATENT DOCUMENTS

| 5,214,413 A | 5/1993 | Okabayashi et al. |
| 2003/0165025 A1 | 9/2003 | Eberhardt et al. |

(Continued)

FOREIGN PATENT DOCUMENTS

| DE | 10144491 C2 | 4/2003 |
| EP | 2477058 A2 | 7/2012 |
| WO | WO 2014065097 A1 | 5/2014 |

*Primary Examiner* — Marin Pichler
(74) *Attorney, Agent, or Firm* — Leydig, Voit & Mayer, Ltd.

(57) ABSTRACT

A display device for a motor vehicle includes: a projection module, configured to generate an image for projection in a direction of vision of a user of the display device along an optical path; a reflection and/or display element, configured to be displaced between a rest position and at least one display position; and a support for the reflection and/or display element, wherein the reflection and/or display element is configured to be displaced between its rest position and its at least one display position by the support. The reflection and/or display element and the support are connected via first, second, third, fourth, fifth, sixth and seventh surfaces, wherein the first, second, third, fourth and fifth surfaces are planar surfaces, wherein the sixth and seventh surfaces are curved surfaces, and wherein the first, second, third and fourth surfaces are parallel to the axis of rotation.

6 Claims, 3 Drawing Sheets

(51) Int. Cl.
　　*F16C 11/06*　　　(2006.01)
　　*B60R 11/02*　　　(2006.01)
　　*B60R 11/00*　　　(2006.01)

(52) U.S. Cl.
　　CPC ... *B60K 2350/2052* (2013.01); *B60R 11/0229* (2013.01); *B60R 2011/008* (2013.01); *F16C 11/0623* (2013.01); *G02B 2027/0154* (2013.01); *G02B 2027/0169* (2013.01)

(58) Field of Classification Search
　　CPC ............ G02B 27/0101; G02B 27/0006; G02B 2027/0141; G02B 2027/0154; G02B 2027/0159; G02B 2027/0161; G02B 2027/0169; B60K 35/00; B60K 2350/1072; B60K 2350/2052; B60K 2350/2056; B60K 2350/2095; B60R 11/0229; B60R 11/0235; B60R 2011/088; B60R 2011/0082–2011/0085; F16C 11/0623–11/0638; F16C 11/045; B60J 3/0208
　　See application file for complete search history.

(56) References Cited

U.S. PATENT DOCUMENTS

| | | |
|---|---|---|
| 2010/0046082 A1 | 2/2010 | Croy et al. |
| 2013/0201541 A1 | 8/2013 | Sasaki et al. |
| 2015/0286054 A1 | 10/2015 | Ushida et al. |

DISPLAY DEVICE FOR A MOTOR VEHICLE

CROSS-REFERENCE TO RELATED APPLICATIONS

This application is a U.S. National Phase application under 35 U.S.C. § 371 of International Application No. PCT/EP2015/059427, filed on Apr. 29, 2015, and claims benefit to French Patent Application No. FR 14/01012, filed on Apr. 30, 2014. The International Application was published in French on Nov. 5, 2015 as WO 2015/166012 A1 under PCT Article 21(2).

FIELD

The present invention relates to a display device, in particular for a motor vehicle.

BACKGROUND

Display devices of the head up type are known, in particular using the projection of an image towards a windscreen as described in U.S. Pat. No. 5,214,413 or towards a reflection element.

Head up display devices make it possible to project information into the field of vision in the space in front of the motor vehicle in order that the driver of the motor vehicle can read this information without taking his eyes off the space in front of the motor vehicle. At the same time, the information can be read without modifying the accommodation of the eyes of the driver of the vehicle.

It is advantageous that—depending on the needs of the vehicle user—the reflection and/or display element can be used with the head (or eyes) of the vehicle user in a number of positions.

One disadvantage of such prior art devices is the fact that a relatively large amount of effort is required to create the link between the support for a reflection and/or display element and the reflection and/or display element. DE 10 144 491 C2 proposes using a spring but this leads to relatively high costs for the display device.

SUMMARY

In an exemplary embodiment, the present invention provides a display device for a motor vehicle. The display device includes: a projection module, configured to generate an image for projection in a direction of vision of a user of the display device along an optical path; a reflection and/or display element, configured to be displaced between a rest position and at least one display position; and a support for the reflection and/or display element, wherein the reflection and/or display element is configured to be displaced between its rest position and its at least one display position by the support. The reflection and/or display element is configured for an at least partially relative rotational movement with respect to the support between the rest and display positions of the reflection and/or display element, the relative rotational movement being provided around an axis of rotation. The reflection and/or display element and the support are connected via first, second, third, fourth, fifth, sixth and seventh surfaces, wherein the first, second, third, fourth and fifth surfaces are planar surfaces, wherein the sixth and seventh surfaces are curved surfaces, and wherein the first, second, third and fourth surfaces are parallel to the axis of rotation.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
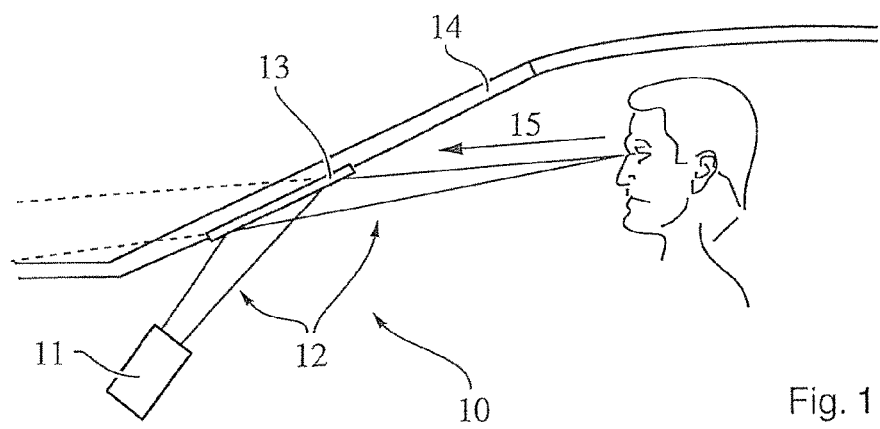
FIG. 1 is a schematic cross-sectional view of a display device in accordance with the present invention.

Exemplary embodiments of the present invention provide a head up display device having a reflection and/or display element which is reliably connected to its support at reduced cost.

In an exemplary embodiment, the present invention provides a display device, in particular for a motor vehicle, comprising a projection module to generate an image for projection in the normal direction of vision of a user of the display device along an optical path, the display device comprising a reflection and/or display element, the reflection and/or display element being able to be displaced between a rest position and at least one display position, the display device comprising a support for the reflection and/or display element such that the reflection and/or display element is displaced between its rest position and its at least one display position by the support, the reflection and/or display element carrying out at least partially a relative rotational movement with respect to the support of the reflection and/or display element between the rest and display positions of the reflection and/or display element, the relative rotational movement being provided around an axis of rotation, the reflection and/or display element and the support being connected via first, second, third, fourth and fifth surfaces, which are planar surfaces and via six and seventh surfaces, which are curved surfaces. The first, second, third and fourth surfaces are parallel to the axis of rotation.

By producing a display device in this way it is advantageously possible to create a connection between the reflection and/or display element and its support in a simple and inexpensive manner.

Another preferred improvement of the invention resides in the fact that the sixth and seventh surfaces are surfaces of the reflection and/or display element and in that the first, second, third, fourth and fifth surfaces are surfaces of the support of the reflection and/or display element, the first, second and sixth surfaces and the third, fourth, fifth and seventh surfaces being pressed against one another by springs.

Another preferred improvement of the invention resides in the fact that the springs are configured such that the first, second and sixth surfaces and the third, fourth, fifth and seventh surfaces permit a relative rotational movement between the reflection and/or display element and the support.

According to another variation of the present invention it is also preferred if the first and second surfaces as well as the third, fourth and fifth surfaces are inclined towards one another.

Another preferred improvement of the invention resides in the fact that the rest position of the reflection and/or display element corresponds to a rest position of the support of the reflection and/or display element and the display position of the reflection and/or display element corresponds to a display position of the support of the reflection and/or display element.

Still another preferred improvement of the invention resides in the fact that the support of the reflection and/or display element at least partially carries out a translational movement between its rest and display positions.

One preferred improvement of the invention also resides in the fact that the reflection and/or display element can be positioned in a plurality of different display positions.

One preferred improvement of the invention resides in the fact that between the different display positions of the reflection and/or display element, the reflection and/or display element is subjected to a rotary and/or translational movement.

Still another preferred improvement of the present invention resides in the fact that the reflection and/or display element is driven between its rest position and its at least one display position by a motor element, particularly a stepping motor.

Other features and advantages of the invention will be apparent upon reading the following description of a particular, non-limiting embodiment of the present invention.

As shown in FIG. 1, a display device 10 in accordance with the present invention comprises a projection module 11 which generates an image in the normal direction of vision 15 of a user of the display device 10 in an optical path 12.

The optical path 12 normally comprises at least one reflection and/or display element 13. In this way, the optical path 12 can comprise a (single) reflection element as shown in FIG. 1. Moreover, the optical path 2 can also comprise two reflection elements. The display device 10 can also be produced with either a reflection element 13 or with a display element (such as for example a thin film transistor (TFT)), or with a reflection and display element.

The normal direction of vision 15 is the viewing direction of a user of the display device 10, in particular a motor vehicle driver, when this person is looking, in particular through a windscreen 14, at the outside area in front of the motor vehicle.

In accordance with the present invention, the reflection and/or display element 13 is an element positioned spaced apart from the windscreen 14. In accordance with a preferred embodiment of the present invention, the reflection and/or display element 13 can be positioned in a rest position and in at least one display position. When the reflection and/or display element 13 is positioned in its rest position, the reflection and/or display element 13 is e.g. positioned inside a housing of the display device 10.

When the reflection and/or display element 13 is positioned in its display position, the reflection and/or display element 13 is typically positioned upright or virtually vertically so that the user of the display device, in particular the driver of the motor vehicle, can look through the reflection and/or display element 13. The change in position of the rest position and the display position of the reflection and/or display element 13 is carried out by a rotational and/or translational movement.

Different positions of the reflection and/or display element 13 can correspond to different display positions and adapted to different heights of the head of the user. The reflection and/or display element 13 is typically driven by a motor element, either directly or via a transmission element. The motor element can in particular be a linear motor element or a rotational motor element, in particular an electric stepping motor element.

In accordance with the present invention, a support element 16 or a support 16 is associated with the reflection and/or display element 13. The support 16 or the support element 16 can be driven between different positioning states, in particular via the motor element.

Figure 2:
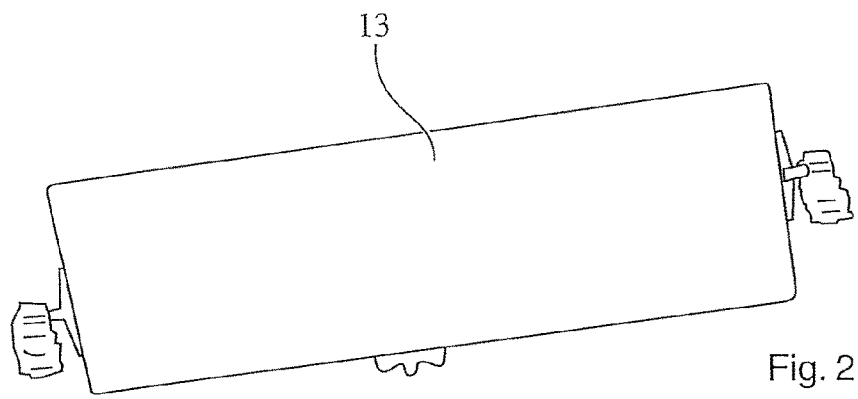
FIG. 2 is a schematic view of the reflection and/or display element of the display device in accordance with the present invention.

FIG. 2 is a schematic view of the reflection and/or display element of the display device in accordance with the present invention. The reflection and/or display element 13 is of a generally oblong shape comprising first and second attachment parts, the attachment parts being provided for flexible attachment to a support as shown in FIGS. 3 to 8. The first and second attachment parts extend in a direction parallel to the main direction of extension of the reflection and/or display element 13. Parallel to this direction there also extends an axis of rotation about which the reflection and/or display element 13 can be rotationally displaced (i.e. via a relative rotational movement) with respect to the support. In order to permit this relative rotational movement, the support comprises a first planar surface and a second planar surface as well as a third planar surface, a fourth planar surface and a fifth planar surface, and the reflection and/or display element comprises, on its first attachment part, a sixth curved surface and, on its second attachment part, a seventh curved surface.

FIGS. 3 to 8 show schematic perspective views of parts of the display device in accordance with the present invention with the reflection and/or display element 13 as well as the support 16. The support 16 comprises a sub-part of each side of the reflection and/or display element 13, each sub-part having a spring, the spring of the first sub-part (of the left side of the reflection and/or display element 13; cf. FIG. 5) bearing the reference sign 22, and the spring of the second sub-part (of the right side of the reflection and/or display element 13; cf. FIG. 8) bearing the reference sign 22'.

Figure 3:
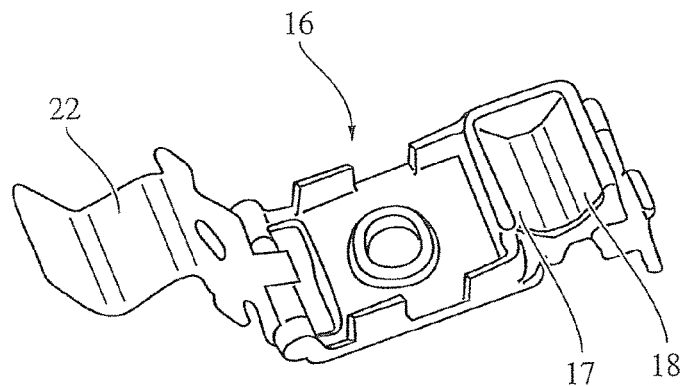
FIGS. 3-8 are schematic perspective views of parts of the display device in accordance with the present invention with the reflection and/or display element as well as its support.
Figure 4:
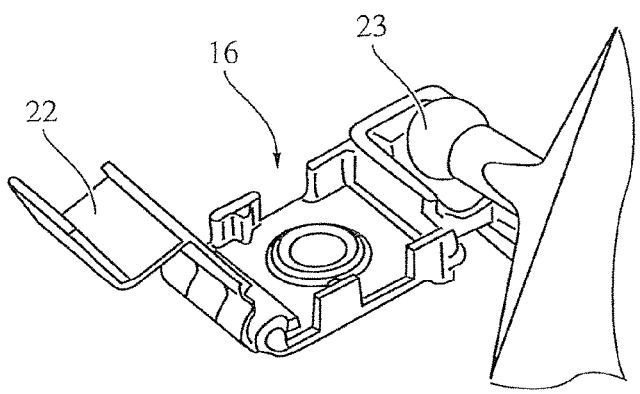
Figure 5:
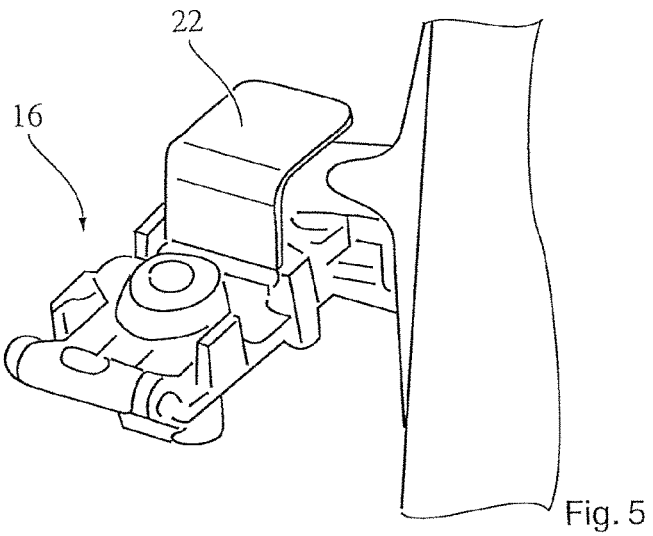
Figure 6:
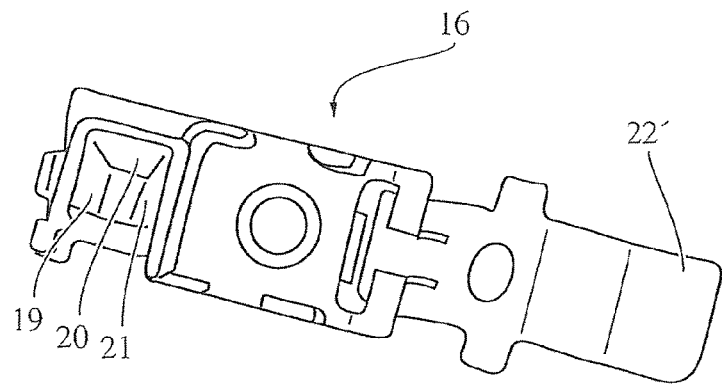
Figure 7:
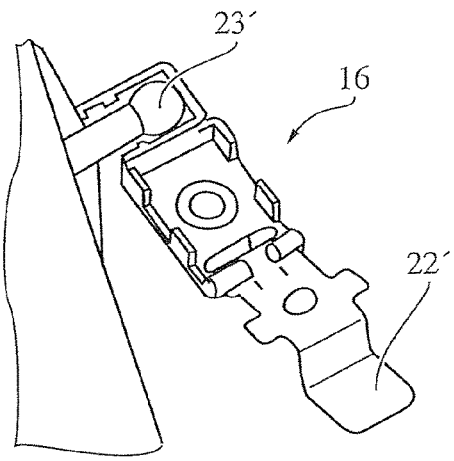
Figure 8:
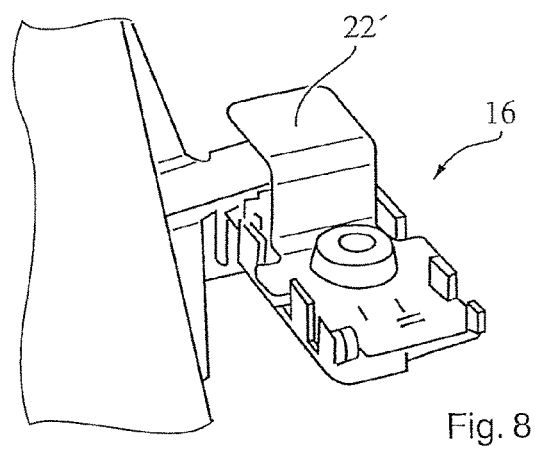

The first sub-part of the support 16 comprises the first planar surface 17 and the second planar surface 18 (cf. FIG. 3). The second sub-part of the support 16 comprises the third planar surface 19, the fourth planar surface 20 and the fifth planar surface 21. The curved surface 23 (sixth surface) of the first attachment part of the reflection and/or display element 13 is pressed—by the spring 22—towards the first and second planar surfaces 17, 18. The curved surface 23' (seventh surface) of the second attachment part of the reflection and/or display element 13 is pressed—by the spring 22'—towards the third, fourth and fifth planar surfaces 19, 20, 21.

The springs 22, 22' are provided to avoid any play between
the first and second surfaces on the one hand and the sixth surface on the other hand, and between
the third, fourth and fifth surfaces on the one hand and the seventh surface on the other hand.

The reflection and/or display element 13 and the support 16 are connected by surfaces, the sixth and seventh surfaces being curved surfaces and the first, second, third, fourth and fifth surfaces being planar surfaces.

In order to facilitate the mounting of the reflection and/or display element 13 with the support 16, the springs 22, 22' are provided in a foldable manner such that in a first assembly step of the display device 10, the first and second attachment parts of the reflection and/or display element 13 are positioned relative to the first, second, third, fourth and fifth surfaces 17, 18, 19, 20, 23 of the support 16 (cf. FIGS. 4 and 7), and that in a second assembly step of the display device 10, the springs 22, 22' are folded (or positioned) to press the sixth and seventh (curved) surfaces against the first, second, third, fourth and fifth surfaces 17, 18, 19, 20, 23 of the support 16.

The pressing force of the springs 22, 22' is preferably such that a relative rotational movement between the reflection and/or display element 13 and the support is easily possible without there being play between the reflection and/or display element 13 and the support 16.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 10 display device
11 projection module
12 optical path
13 reflection and/or display element
13' rotational movement
14 windscreen
15 normal direction of vision
16 support
17 first surface
18 second surface
19 third surface
20 fourth surface
21 fifth surface
22, 22' springs
23 sixth surface
23' seventh surface

The invention claimed is:

1. A display device for a motor vehicle, comprising:
    a projection module, configured to generate an image for projection in a direction of vision of a user of the display device along an optical path;
    a reflection and/or display element, configured to be displaced between a rest position and at least one display position; and
    a support for the reflection and/or display element, wherein the reflection and/or display element is configured to be displaced between its rest position and its at least one display position by the support,
    wherein the reflection and/or display element is configured for an at least partially relative rotational movement with respect to the support between the rest and display positions of the reflection and/or display element, the relative rotational movement being provided around an axis of rotation,
    wherein the reflection and/or display element and the support are connected via first, second, third, fourth, fifth, sixth, and seventh surfaces, the first, second, third, fourth, and fifth surfaces being planar surfaces, the sixth and seventh surfaces being curved surfaces, and the first, second, third, and fourth surfaces being parallel to the axis of rotation,
    wherein the sixth and seventh surfaces are surfaces of the reflection and/or display element, and the first second, third, fourth, and fifth surfaces are surfaces of the support, and
    wherein the first, second, and sixth surfaces are pressed against one another by a first spring, and the third, fourth, fifth, and seventh surfaces are pressed against one another by a second spring, such that the first and second springs pressing forces in a direction orthogonal to the axis of rotation.

2. The display device according to claim 1, wherein the first and second springs are configured such that the first, second, and sixth surfaces, and the third, fourth, fifth, and seventh surfaces, permit relative rotational movement between the reflection and/or display element and the support.

3. The display device according to claim 1, wherein the first and second surfaces, as well as the third, fourth, and fifth surfaces, are inclined towards one another.

4. The display device according to claim 1, wherein the rest position of the reflection and/or display element corresponds to a rest position of the support, and
    wherein the display position of the reflection and/or display element corresponds to a display position of the support.

5. The display device according to claim 1, wherein the reflection and/or display element is configured to be positioned in a plurality of different display positions.

6. The display device according to claim 5, wherein the reflection and/or display element is configured to be subjected to a rotary movement between the different display positions.

* * * * *